(12) United States Patent
Yamada (10) Patent No.: US 6,798,471 B2
(45) Date of Patent: Sep. 28, 2004

(54) LIQUID CRYSTAL DISPLAY

(75) Inventor: Tsutomu Yamada, Tainan (TW)

(73) Assignee: Chi Mei Optoelectronics Corp., Tainan (TW)

( * ) Notice: Subject to any disclaimer, the term of this patent is extended or adjusted under 35 U.S.C. 154(b) by 358 days.

(21) Appl. No.: 09/841,114

(22) Filed: Apr. 25, 2001

(65) Prior Publication Data

US 2002/0159012 A1 Oct. 31, 2002

(51) Int. Cl.[7] .................... G02F 1/1338; G02F 1/1337
(52) U.S. Cl. .................... 349/106; 349/129; 349/130; 349/122; 349/117; 349/118; 349/119; 349/120
(58) Field of Search .................... 349/106, 110, 349/111, 122, 143, 129, 113, 139

(56) References Cited

U.S. PATENT DOCUMENTS

| | | | | |
|---|---|---|---|---|
| 6,040,885 A | * | 3/2000 | Koike et al. | 349/129 |
| 6,424,398 B1 | * | 7/2002 | Taniguchi | 349/143 |
| 6,441,878 B1 | * | 8/2002 | Wong | 349/143 |
| 6,476,890 B1 | * | 11/2002 | Funahata et al. | 349/113 |
| 6,504,592 B1 | * | 1/2003 | Takatori et al. | 349/129 |
| 6,525,797 B2 | * | 2/2003 | Tsuda et al. | 349/139 |
| 6,593,982 B2 | * | 7/2003 | Yoon et al. | 349/106 |
| 2001/0006408 A1 | * | 7/2001 | Matsuyama et al. | 349/143 |
| 2001/0007487 A1 | * | 7/2001 | Yoon et al. | 349/106 |

FOREIGN PATENT DOCUMENTS

EP          0884626 A2     12/1998

* cited by examiner

*Primary Examiner*—Nathan J. Flynn
*Assistant Examiner*—Fazli Erdem
(74) *Attorney, Agent, or Firm*—Dykema Gossett PLLC (57) ABSTRACT

A liquid crystal display device comprising: a first substrate and a second substrate processed for vertical alignment; a liquid crystal having a negative dielectric constant anisotropy and being sandwiched between the first and second substrates; a plurality of color filters on the first substrate, each of the color filters having at least a first depression formed therein; a common electrode on the color filters, the common electrode having a plurality of second depressions corresponding to the first depressions of the color filters; and a dielectric material filled into the second depressions of the common electrode, the dielectric material having a dielectric constant smaller than the dielectric constant of the liquid crystal.

13 Claims, 6 Drawing Sheets

LIQUID CRYSTAL DISPLAY

BACKGROUND OF THE INVENTION

1. Field of the Invention

The present invention relates to a liquid crystal display (LCD), and more particularly to a vertically-aligned (VA) LCD having a color filter (CF) substrate with depressions for improving the viewing angle performance thereof.

2. Description of the Related Art

Vertically-aligned (VA) LCD is a mode using a negative liquid crystal material and vertical alignment film. When no voltage is applied, liquid crystal molecules are aligned in a vertical direction and black display appears. When a predetermined voltage is applied, the liquid crystal molecules are aligned in a horizontal direction and white display appears. Comparing to the twisted nematic (TN) LCD, the vertically-aligned (VA) LCD provides higher contrast, higher response speed, and excellent viewing angle characteristic for white display and black display. However, the VA LCD still has a critical drawback of a narrow viewing angle range. This poses a problem that the application of the VA LCD is limited.

It is known that viewing angle performance of a VA LCD can be improved by setting the orientation of the liquid crystal molecules inside pixels to a plurality of mutually different directions. European Patent Publication No. 0884626-A2 discloses a VA LCD having domain regulating means for regulating the orientation of a liquid crystal in which liquid crystal molecules are aligned obliquely when a voltage is applied so that the orientation will include a plurality of directions within each pixel.

Figure 1A:
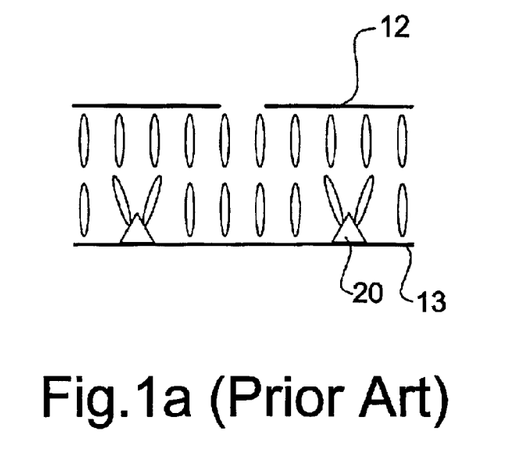
FIGS. 1a to 1c are diagrams for explaining a panel structure and an operational principle of a vertically-aligned (VA) LCD having domain-regulating means according to an embodiment disclosed in EP 0884626.
Figure 1B:
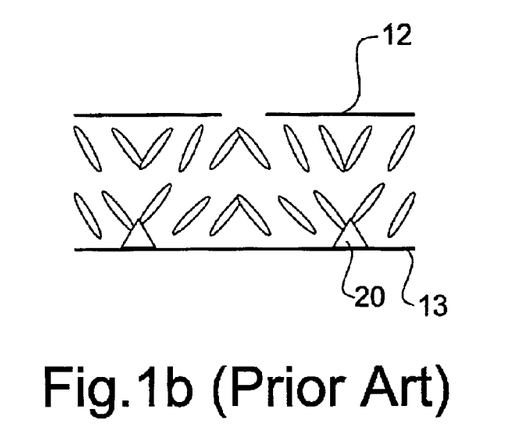
Figure 1C:
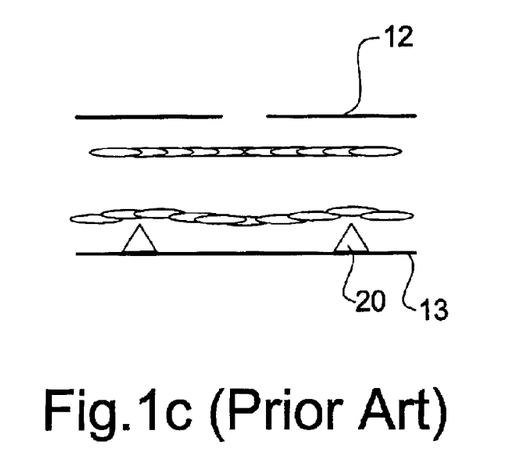
Figure 2:
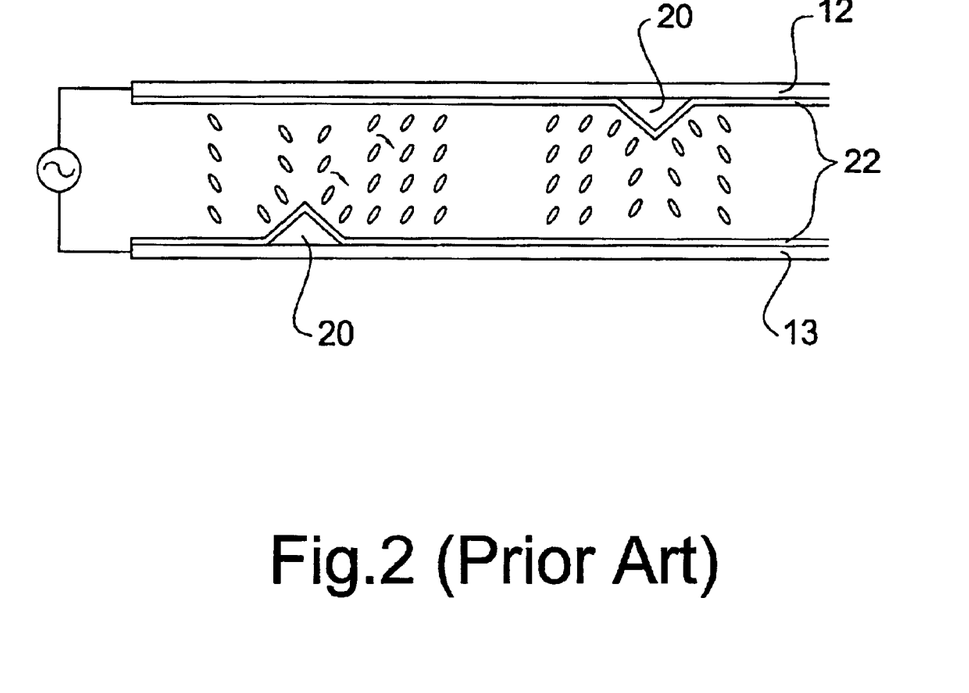
FIG. 2 is a diagram for explaining a panel structure and an operational principle of a VA LCD having domain-regulating means according to another embodiment disclosed in EP 0884626.

In FIGS. 1a to 1c, as the domain regulating means, pixel electrodes 12 on a TFT (Thin Film Transistor) substrate are slitted, and the common electrode 13 on a CF (color filter) substrate is provided with protrusions 20. As shown in FIG. 1a, in a state in which no voltage is applied, liquid crystal molecules are aligned vertically to the surfaces of the substrates. When an intermediate voltage is applied, as shown in FIG. 1b, electric fields oblique to the surfaces of the substrates are produced near the slits of the electrodes (edges of the electrodes). Moreover, liquid crystal molecules near the protrusions 20 slightly tilt relative to their state while no voltage is applied. The inclined surfaces of the protrusions 20 and the oblique electric fields generated between the substrates determine the directions in which the liquid crystal molecules are tilted. The orientation of the liquid crystal is divided into different directions along a plane defined by each pair of protrusions 20 and the center of each slit thereby improving viewing angle performance. FIG. 2 shows another example of realizing the domain regulating means by providing protrusions 20 alternately on the electrodes 12 and 13, and coated with the vertical alignment films 22. When no voltage is applied, the liquid crystal molecules are aligned vertically to the surfaces of the substrates in principles. On the inclined surfaces of the protrusions, however, the liquid crystal molecules are aligned at a little tilt. When a voltage is applied as shown in FIG. 2, the liquid crystal molecules are tilted in different directions.

Figure 3:
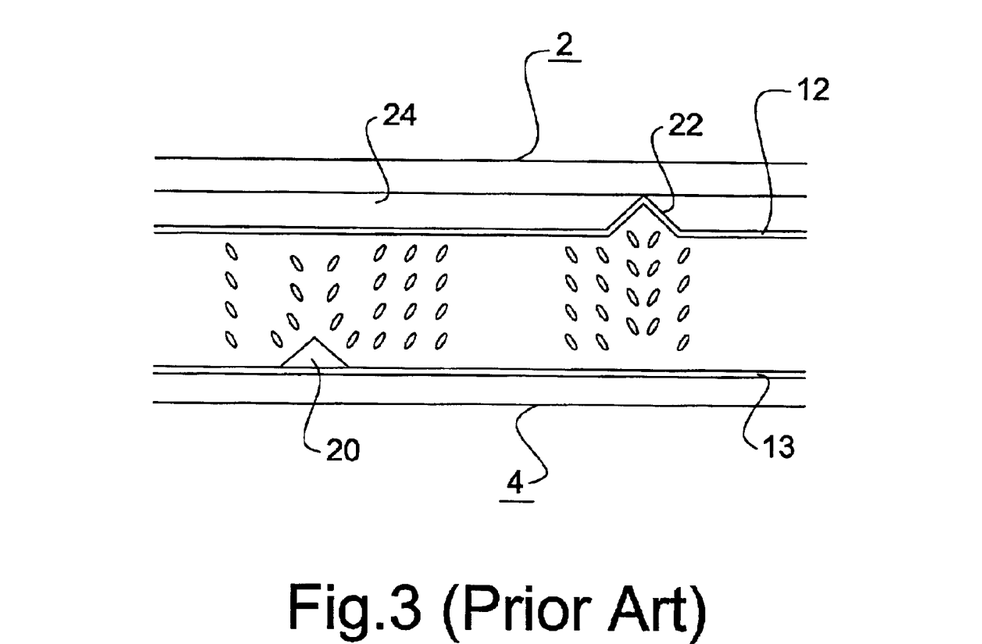
FIGS. 3 and 4 are diagrams for explaining a panel structure and an operational principle of a VA LCD having domain-regulating means according to another prior art.
Figure 4:
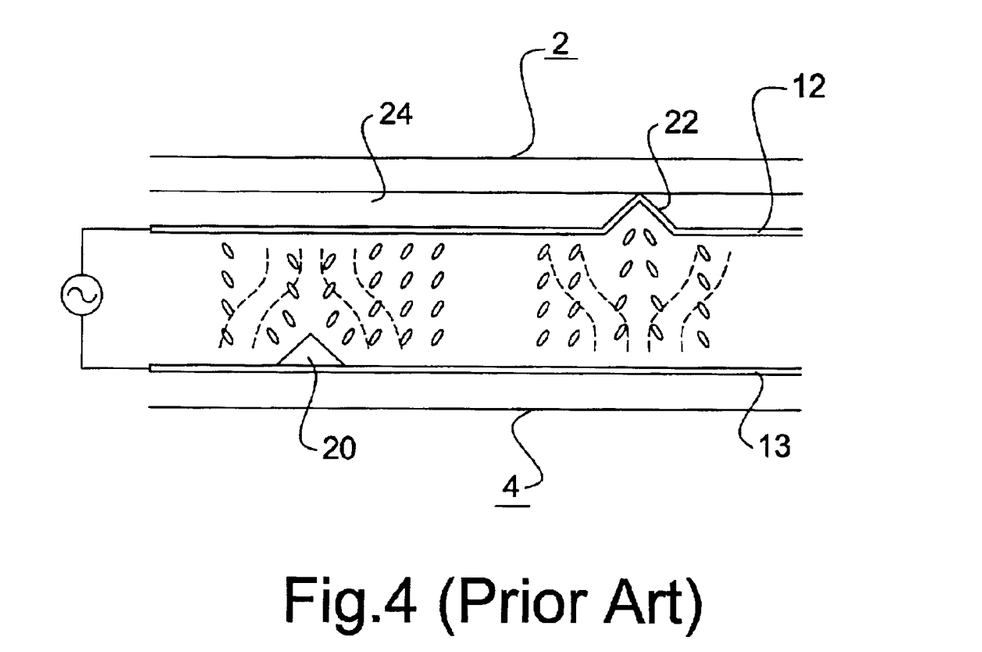

It is known that protrusions or electrode slits can be formed on the TFT substrate by utilizing the conventional process as it is. However, it is very difficult to form protrusions or electrode slits on CF substrate without introducing any additional step. Therefore, it is proposed that the domain regulating means is realized by using a depression instead of a protrusion (see FIG. 3 and FIG. 4). As shown, color filters 24 having depressions 22 are formed on the CF substrate 2. An electrode 12 is formed on the color filters 24; hence, areas on the electrode 12 at which corresponds to the depressions 22 are recessed. Protrusions 20 on the electrodes 13 are formed on the TFT substrate 4. Vertical alignment films (not shown) are further formed on the electrodes 12 and 13, respectively. As shown in FIG. 3, in a state in which no voltage is applied, liquid crystal molecules are aligned vertically to the surfaces of the substrates. When an intermediate voltage is applied, oblique electric fields (indicated by dotted line shown in FIG. 4) are generated near the depressed portions of the electrode 12 and the protrusions 20. When the color filters 24 are formed on the CF substrate 2, it is easy to form the depressions 22 at the same time without introducing any additional step. However, for liquid crystal molecules near the depressed portions of the electrode 12, the tilt direction of the liquid crystal molecules under electric field (see FIG. 4) is opposite to the directions in which the liquid crystal molecules are pre-tilted because of the depressed portions of the electrode 12 (see FIG. 3). This leads to a problem that its response (switching) speed is not fast enough; particularly, a response speed for transition from a state in which no voltage is applied to a state in which a voltage is applied is relatively slow.

The present invention therefore seeks to provide a VA LCD that overcomes, or at least reduces the above-mentioned problems of the prior art.

SUMMARY OF THE INVENTION

It is a primary object of the present invention to provide a vertically-aligned (VA) LCD having a color filter (CF) substrate with filled depressions that substantially obviates one or more problems due to limitations and disadvantages of the prior art.

To achieve the object described above, the present invention provides a liquid crystal display device comprising: a first substrate and a second substrate processed for vertical alignment; a liquid crystal having a negative dielectric constant anisotropy and being sandwiched between the first and second substrates; a plurality of color filters on the first substrate, each of the color filters having at least a first depression formed therein; a common electrode on the color filters, the common electrode having a plurality of second depressions corresponding to the first depressions of the color filters; and a dielectric material filled into the second depressions of the common electrode, the dielectric material having a dielectric constant smaller than the dielectric constant of the liquid crystal.

According to a first embodiment, the second depressions of the common electrode are filled by the dielectric material thereby forming a substantially flat surface level with the surface of the first substrate. Since the liquid crystal molecules are aligned vertically to the surface of the substrate in principle, the pre-tilt angle of liquid crystal molecules near the second depressions of the common electrode is minimized thereby improving the response (switching) speed for transition from a state in which no voltage is applied to a state in which a voltage is applied.

According to a second embodiment, the second depressions of the common electrode are filled by the dielectric material thereby forming protrusions corresponding to the second depressions. Therefore, for liquid crystal molecules near the second depressions of the common electrode, the tilt direction of the liquid crystal molecules under electric field matches the directions in which the liquid crystal molecules are pre-tilted because of the protrusions formed corresponding to the second depressions.

BRIEF DESCRIPTION OF THE DRAWINGS

Other objects, advantages, and novel features of the invention will become more apparent from the following detailed description when taken in conjunction with the accompanying drawings.

DETAILED DESCRIPTION OF THE PREFERRED EMBODIMENT

Figure 5:
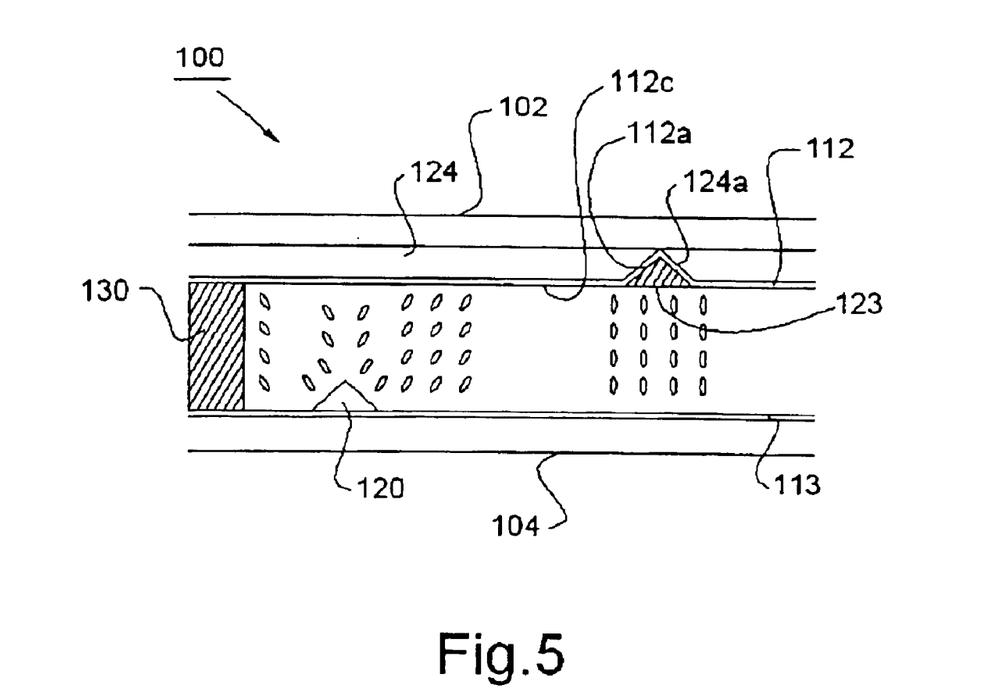
FIG. 5 is a diagram for explaining a panel structure and an operational principle of a VA LCD having a color filter (CF) substrate with filled depressions according to a first preferred embodiment of the present invention.

FIG. 5 is a diagram showing the overall configuration of a liquid crystal panel 100 of the first embodiment of the present invention. As shown, the liquid crystal panel of the first embodiment is a TFT LCD. A plurality of color filters 124 (only one shown in FIG. 5) are formed on the glass substrate 102. Each color filter 124 has at least a depression 124a formed therein. A common electrode 112 is formed on the color filters 124 having the depression 124a. The common electrode 112 has a plurality of depressions 112a corresponding to the depressions 124a of the color filters 124 and has a surface 112c facing to an opposite glass substrate 104. It is noted that the depressions 112a of the common electrode 112 are filled by a dielectric material. The opposite glass substrate 104 is provided with a plurality of scan bus lines (not shown) formed parallel to one another, a plurality of data bus lines (not shown) formed parallel to one another vertically to the scan bus lines, and TFTs (not shown) and pixel electrodes 113 formed like a matrix at intersections between the scan bus lines and data bus lines. The pixel electrode 113 may be further provided with protrusions 120 or electrode slits (not shown in FIG. 5). The surfaces of the substrates are processed for vertical alignment. A negative liquid crystal is sealed in between the two substrates. The glass substrate 102 is referred to as a color filter (CF) substrate because color filters are formed, while the glass substrate 104 is referred to as a TFT substrate. Spacers 130 are formed between the substrates 102, 104 for defining the gap between the substrates. Preferably, the dielectric material filling the depressions 112a has a dielectric constant smaller than the dielectric constant of the negative liquid crystal. In the first embodiment shown in FIG. 5, after filling the depressions 112a with the dielectric material, a substantially flat surface 123 is formed and level with the surface 112c of the common electrode 112. In this embodiment, the dielectric material may be the same as the material of the spacers 130.

When no voltage is applied, the liquid crystal molecules are aligned vertically to the surface of the substrate in principle. Therefore, as shown in FIG. 5, the liquid crystal molecules near the filled depressions 112a are aligned in a vertical direction because the level surface formed from the dielectric material. Thus, the pre-tilt angle of the liquid crystal molecules is minimized thereby improving the response (switching) speed for transition from a state in which no voltage is applied to a state in which a voltage is applied. Furthermore, the light leakage near a depression or protrusion in the black state (when no voltage is applied) increases with an increased pre-tilt angle of the liquid crystal molecules nearby. Since the liquid crystal molecules near the filled depressions 112a are aligned in a vertical direction, no light therefore leaks out near the filled depressions 112a thereby obtaining a higher contrast.

Figure 6:
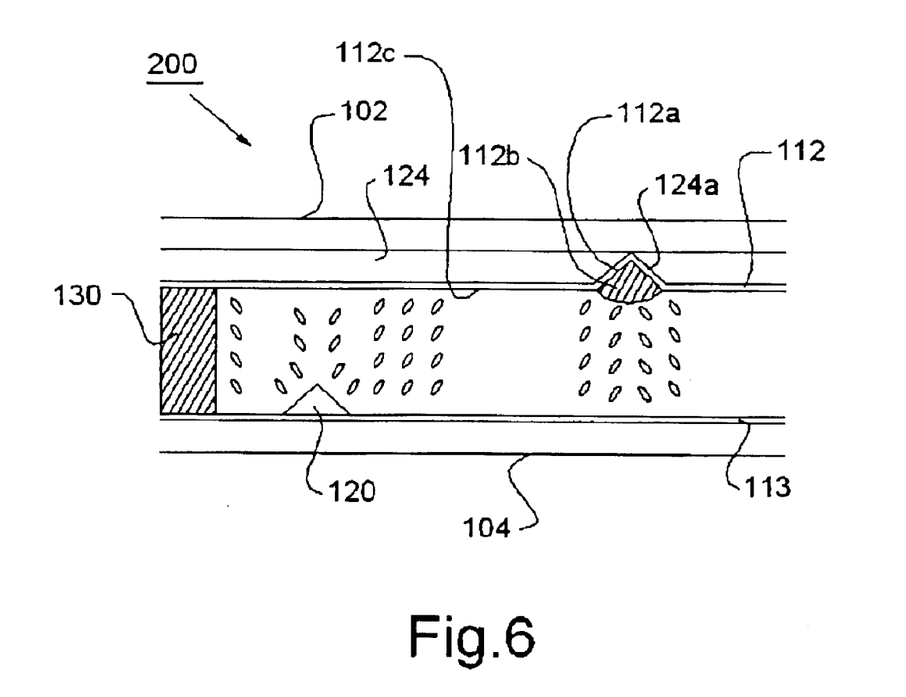
FIG. 6 is a diagram for explaining a panel structure and an operational principle of a VA LCD having a color filter (CF) substrate with filled depressions according to a second preferred embodiment of the present invention.

FIG. 6 is a diagram showing the overall configuration of a liquid crystal panel 200 of the second embodiment of the present invention. The liquid crystal panel 200 is substantially identical to the liquid crystal panel 100 of FIG. 5 with exception that the depressions 112a of the common electrode 112 are filled by the dielectric material thereby forming protrusions 112b over the depressions 112a. For liquid crystal molecules near the protrusions 112b, the orientation is divided in such a fashion that the liquid crystal molecules are tilted in the opposite direction at the protrusions 112b with no voltage applied (see FIG. 6). That is exactly the same situation when an intermediate voltage is applied. Therefore, for liquid crystal molecules near the filled depressions 112a, the tilt direction of the liquid crystal molecules under electric field matches the directions in which the liquid crystal molecules are pre-tilted because of the protrusions 112b. This further improves the response (switching) speed.

Figure 7:
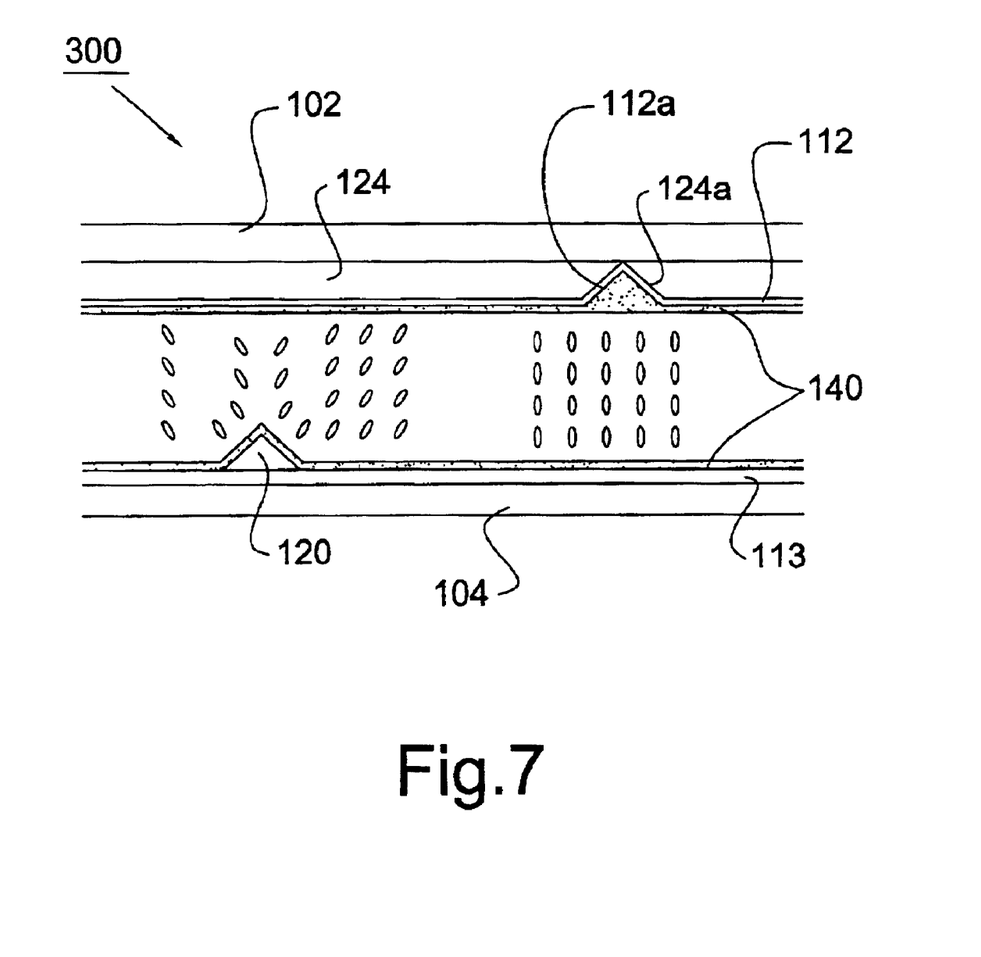
FIG. 7 is a diagram for explaining a panel structure and an operational principle of a VA LCD having a color filter (CF) substrate with filled depressions according to a third preferred embodiment of the present invention.

FIG. 7 is a diagram showing the overall configuration of a liquid crystal panel 300 of the third embodiment of the present invention. The liquid crystal panel 300 is substantially identical to the liquid crystal panel 100 of FIG. 5 with exception that the depressions 112a of the common electrode 112 are filled by vertical alignment film 140. Since the vertical alignment film 140 can be formed on the CF substrate 2 as well as fill up the depressions 112a by utilizing the conventional process as it is, an increase in number of steps can be avoided.

Next, a process of manufacturing a color filter (CF) substrate with filled depressions in accordance with the present invention will be described. Color filters 124 are typically formed as R, G, B (Red, Green, Blue) elements for each pixel. In general, to fabricate the color filters 124, a dyeing method or a dispersing method is used. The dyeing method comprises exposing and developing dyeable and photosensitive resin on a transparent substrate, and dyeing the resin with a dyeing solution. The dispersing method comprises depositing a photosensitive material dispersed with pigment on a transparent substrate, then exposing, and developing. According to the present invention, the exposing step is performed with a mask having various shapes of slits which allows depressions described above to be patterned at the same time. That is, the color filter 124 is patterned to have depressions 124a, and then filled with a dielectric material. The dielectric-material filling step is preferably performed by utilizing the conventional process of the CF substrate such that an increase in number of steps can be avoided. It could be understood that the photodefined spacers used in the conventional process may be further patterned in order to leave the photo spacer material in the depressions 124a so as to form filled depressions 124a with level surface (see FIG. 5) or protrusions (see FIG. 6). Alternatively, the vertical alignment film used in the conventional process may further fill up the depressions 112a so as to form filled depressions 124a (see FIG. 7).

Figure 8:
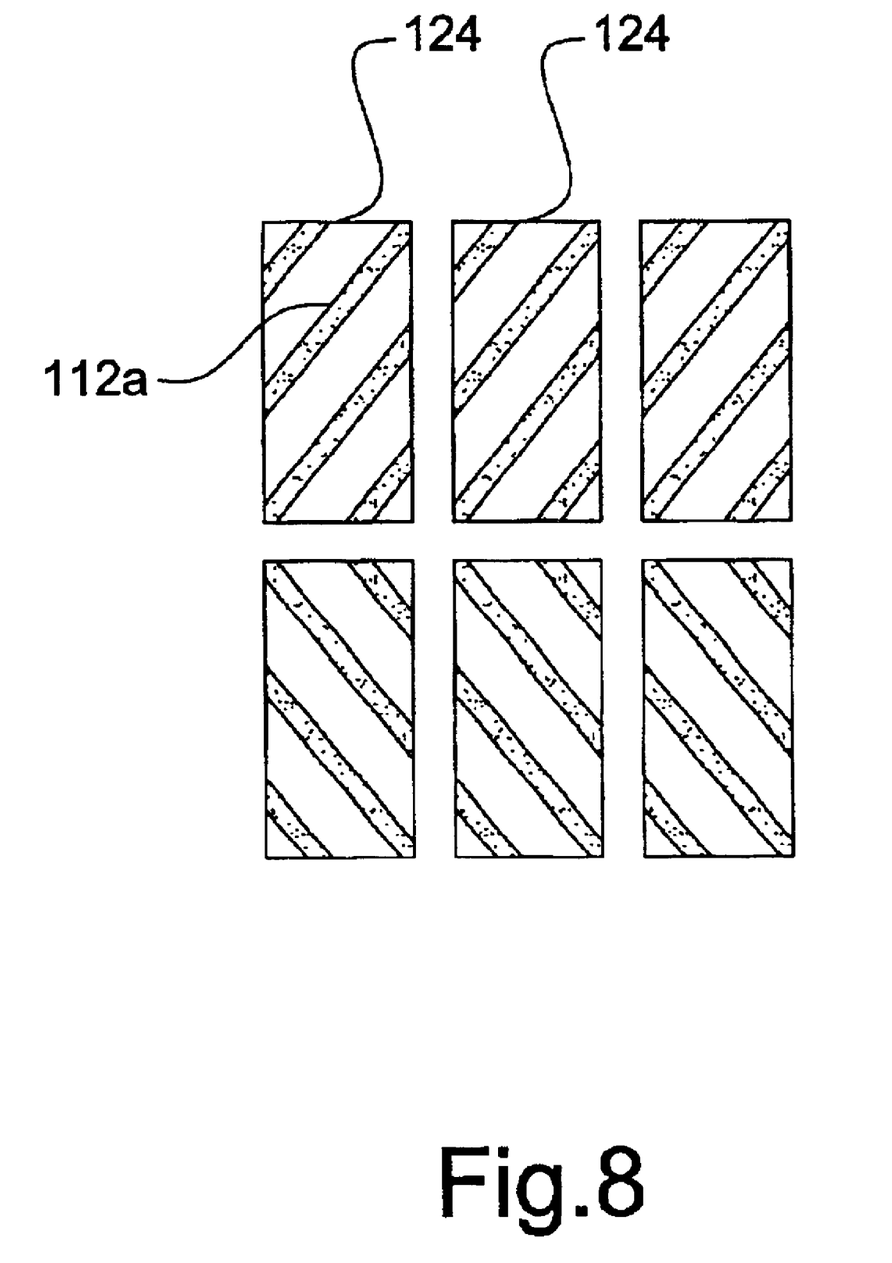
FIG. 8 is a diagram for illustrating a color filter (CF) substrate with filled depressions bent in zigzag according to a preferred embodiment of the present invention.

When the depressions 112a are formed on the CF substrate, the depressions 112a is preferably arranged in parallel to one another with a predetermined pitch among them. Preferably, the predetermined pitch is equal to an integral submultiple of an arrangement pitch of the pixel electrodes 113. Furthermore, when the protrusions or electrode slits are provided on the TFT substrate, the depressions 112a and the protrusions (or electrode slits) are preferably arranged to be offset by a half of the predetermined pitch. Moreover, as shown in FIG. 8, when the filled depressions 112a are formed in zigzag at intervals of a predetermined cycle, orientation division of liquid crystal can be achieved more stably.

Although the invention has been explained in relation to its preferred embodiment, it is to be understood that many other possible modifications and variations can be made without departing from the spirit and scope of the invention as hereinafter claimed.

What is claimed is:

1. A liquid crystal display device, comprising:
    a first substrate and a second substrate processed for vertical alignment;
    a liquid crystal having a negative dielectric constant anisotropy and being sandwiched between the first and second substrates;
    a plurality of color filters on the first substrate, each of the color filters having at least a first depression formed therein;
    a common electrode on the color filters, the common electrode having a surface facing to the second substrate and a plurality of second depressions corresponding to the first depressions of the color filters; and
    a dielectric material filling up the second depressions of the common electrode, the dielectric material having a dielectric constant smaller than the dielectric constant of the liquid crystal,
    wherein the dielectric material has a substantially flat surface level with the surface of the common electrode.

2. The liquid crystal display device as claimed in claim 1, further comprising photodefined spacers disposed between the first and second substrates for defining the gap between the two substrates, and the dielectric material is the same as the material of the photodefined spacers.

3. The liquid crystal display device as claimed in claim 1, further comprising a vertical alignment film formed on each substrate, and the second depressions are filled up with the material of the vertical alignment film formed on the first substrate.

4. A liquid crystal display device comprising:
    a first substrate and a second substrate processed for vertical alignment;
    a liquid crystal having a negative dielectric constant anisotropy and being sandwiched between the first and second substrates;
    a plurality of color filters on the first substrate, each of the color filters having at least a first depression formed therein, each of the first depressions extending in a direction, the first depressions being arranged in parallel to one another with a predetermined pitch among them;
    a common electrode on the color filter layer, the common electrode having a plurality of second depressions corresponding to the first depressions of the color filter layer;
    a dielectric material filling up the second depressions of the common electrode, the dielectric material having a dielectric constant smaller than the dielectric constant of the liquid crystal, wherein the dielectric material forms a plurality of first protrusions over the second depressions; and
    an array of second protrusions, depressions or slits provided on the second substrate, each extending in the direction, the second protrusions, depressions or slits being arranged in parallel to one another with the predetermined pitch among them.

5. The liquid crystal display device as claimed in claim 4, further comprising photodefined spacers are formed between the first and second substrates for defining the gap between the two substrates, and the dielectric material is the same as the material of the photodefined spacers.

6. The liquid crystal display device as claimed in claim 4, further comprising a vertical alignment film formed on each substrate, and the second depressions are filled up with the material of the vertical alignment film formed on the first substrate.

7. A liquid crystal display device as claimed in claim 4, wherein the first depressions of the color filter layer are offset by a half of the predetermined pitch from the second protrusions, depressions or slits of the second substrate.

8. A liquid crystal display device as claimed in claim 7, wherein pixel electrodes are formed on the second substrate, and the predetermined pitch is equal to an integral submultiple of an arrangement pitch of the pixel electrodes.

9. A liquid crystal display device as claimed in claim 4, wherein the first depressions of the color filter layer are bent in zigzag at intervals of a predetermined cycle, and the second protrusions, depressions or slits provided on the second substrate are bent in zigzag at intervals of the predetermined cycle.

10. A method of manufacturing a liquid crystal display device comprising the steps of:

providing a first substrate and a second substrate;

forming a liquid crystal having a negative dielectric constant anisotropy between the first and second substrates;

forming color filters on the first substrate, each of the color filters having at least a first depression formed therein;

forming a common electrode on the color filters, the common electrode having a second depressions corresponding to the first depressions of the color filter layer;

forming photodefined spacers on the first substrate, the material of the spacers also filling up the second depressions of the common electrode, the material of the spacers having a dielectric constant smaller than the dielectric constant of the liquid crystal; and forming a vertical alignment layer on each of the substrates.

11. The method as claimed in claim 10, wherein the filled second depressions have a substantially flat surface level with the surface of the first substrate.

12. The method as claimed in claim 10, the material of the spacers forms protrusions over the second depressions.

13. A method of manufacturing a liquid crystal display device comprising the steps of:

providing a first substrate and a second substrate;

forming a liquid crystal having a negative dielectric constant anisotropy between the first and second substrates;

forming color filters on the first substrate, each of the color filters having at least a first depression formed therein;

forming a common electrode on the color filters, the common electrode having a surface facing to the second substrate and a second depressions corresponding to the first depressions of the color filter layer; and forming a vertical alignment film on each of the substrates, the material of the vertical alignment film also filling up the second depressions of the common electrode to obtain a substantially flat surface level with the surface of the common electrode, the material of the vertical alignment film having a dielectric constant smaller than the dielectric constant of the liquid crystal.

* * * * *